F. W. CALDWELL.
VARIABLE PITCH OR REVERSIBLE PROPELLER.
APPLICATION FILED MAY 5, 1921.
1,404,269.
Patented Jan. 24, 1922.
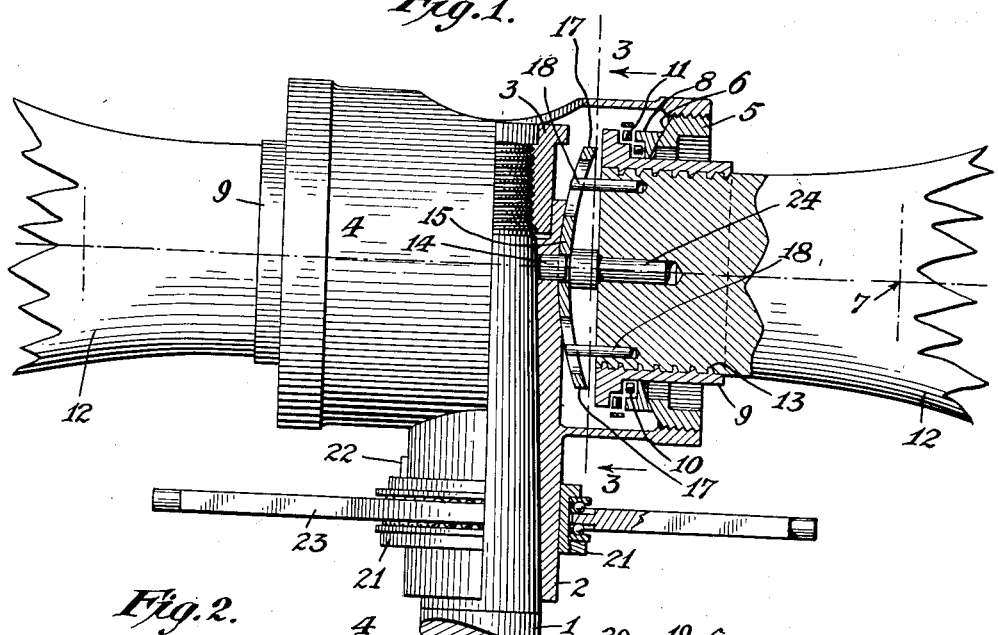
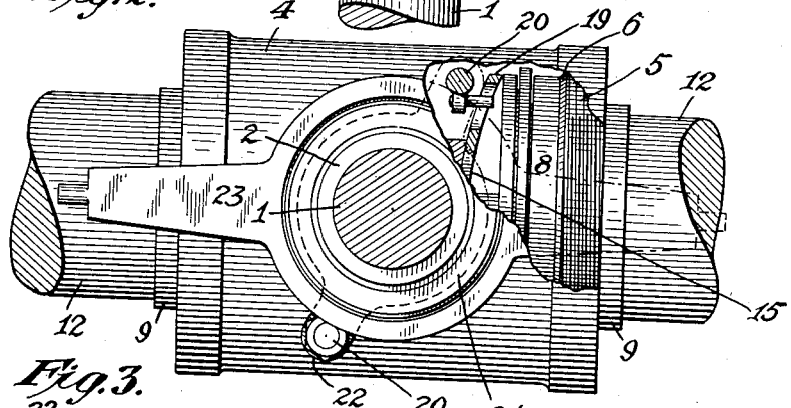
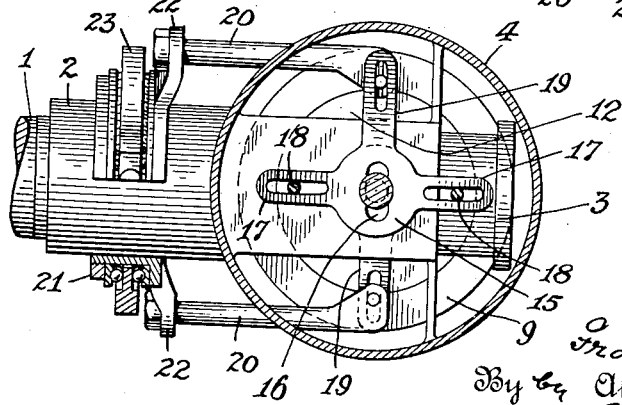
Inventor
Frank W. Caldwell
By his Attorney
Frank L. Hver

UNITED STATES PATENT OFFICE.

FRANK W. CALDWELL, OF DAYTON, OHIO.

VARIABLE-PITCH OR REVERSIBLE PROPELLER.

1,404,269.　　　　　Specification of Letters Patent.　　Patented Jan. 24, 1922.

Application filed May 5, 1921. Serial No. 467,065.

*To all whom it may concern:*

Be it known that I, FRANK W. CALDWELL, a citizen of the United States, residing at Dayton, in the county of Montgomery, State of Ohio, and having a post-office address at No. 330 Edgewood Avenue, Dayton, Ohio, have invented certain new and useful Improvements in Variable-Pitch or Reversible Propellers, of which the following is a full, clear, and exact description.

My invention relates to various new and useful improvements in variable pitch or reversible propellers. Preferably my improved propeller provides for an actual reversal of the blade angle so as to completely reverse the direction of the thrust, whereby an aircraft in landing may be quickly brought to rest. The improvements are obviously adapted for merely varying the pitch of the blades instead of completely reversing the same, whereby variations in thrust can be secured for any desired purpose. At the present time reversible aircraft propellers are known and have been successfully used to bring the airplane quickly to rest on landing. With the reversible propellers heretofore employed, it has been the practice to mount each propeller blade in a relatively long sleeve or hub barrel rotating with the shaft, and to employ mechanism operated from the cock-pit by which each blade may be given a turning movement with respect to the hub barrel, whereby its pitch may be changed or reversed.

Under the conditions encountered in aircraft practice, when a propeller is turning at high speed the centrifugal force is extremely great. At the same time the propeller is subjected to a considerable thrust force which is the effective force for driving the aircraft and also a considerable torque force is developed in the rotation of the propeller by the motor. Obviously the centrifugal force is perpendicular to the drive shaft, the thrust force is parallel to the drive shaft and the torque force is concentric to the drive shaft and such forces vary within wide limits determined principally by the speed. Consequently by reason of these forces the twisting of the propeller blade to vary the pitch is difficult, owing to the friction to be overcome. Furthermore, the torque force and the thrust force result in a tendency of the propeller to cramp and bind in the hub barrel, and this introduces further friction to be overcome in varying the pitch. The attempt has been made, of course, to reduce these friction losses by the employment of frictionless bearings (generally roller bearings or ball bearings) and to minimize the cramping referred to by separating such bearings as far as possible within permissible limits. But notwithstanding these expedients the operation of varying the pitch required considerable strength on the part of the operator and a waste of time is involved where fractions of seconds are important.

With my improved propeller, I so construct the same as to permit the pitch to be varied with a substantial elimination of friction, except that due to the centrifugal force and in this respect the friction is much less than that encountered when cramping and binding take place. I entirely eliminate the cramping, binding and friction losses due to the thrust and torque whereby the operation of varying pitch can be carried out more quickly and with less power than is now possible. At the same time I save considerable weight since the relatively ponderous hub barrel now used is dispensed with and the connections between the blades and the shaft are much lightened.

I accomplish this object by so mounting the propeller blades that they will automatically find a position in operation where the thrust and torque will be balanced by the centrifugal force, whereby (as to torque and thrust) the propeller blades may be varied as to pitch as readily when in rapid rotation as when at rest. In this way I eliminate friction now caused by the thrust or torque tending to move the propeller blade out of a true diametric position perpendicular to the shaft. At the same time I so construct the propeller that in the first few rotations of the shaft the blades will act as a true fly wheel, thus permitting the motor to smoothly reach its working speed. Furthermore, the construction is such that in approaching its working speed the propeller blades move to their balanced position with minimum friction and consequent wear. Finally, I have secured a construction in which the pitch of the blade will always remain unchanged notwithstanding any variation in its angular position under the torque or thrust.

In order that the invention may be better understood attention is directed to the accompanying drawing forming a part of this specification, and in which—

Fig. 1 is a longitudinal elevation partly in cross section showing parts of the two propeller blades with the mechanism for mounting the same and for changing or reversing the pitch thereof.

Fig. 2, a section taken through the propeller shaft immediately aft of the yoke and showing a portion of the hub broken away, and Fig. 3, a cross section at right angles to Fig. 2 on the line 3, 3 of Fig. 1, viewed in the direction of the arrows 3, 3.

In the above views corresponding parts are represented by the same numerals.

The propeller shaft 1 is formed with a tapered forward portion on which is fitted the sleeve 2 held in position by the usual nut 3. Formed integral with the sleeve 2 is a hub 4. This hub is materially lighter and shorter than the hubs heretofore used with reversible propellers, since with my improvements it is not necessary to employ relatively widely separated anti-friction bearings to prevent the cramping tendency of the blades due to thrust or torque. This is an important practical consideration in an art where the saving of weight is necessary. Fitting into the ends of the hub 4, preferably by screw threads, is an outer seat bearing 5 whose inner face 6 is a portion of a sphere, the center of which is the point 7 corresponding to the center of rotation. Fitting the spherical face of the outer seat bearing is the corresponding face of the inner seat bearing 8, whereby the inner seat bearing may be free to adjust itself with respect to the outer seat bearing to accommodate variations in the angle of the blade due to thrust or torque. At the same time the construction provides a very strong and rigid means for resisting the centrifugal thrust. The ferrule 9 cooperates with inner seat bearing 8. Between the ferrule 9 and the inner seat bearing is a roller radial race 10 comprising a string of anti-friction rollers, the axes of which extend parallel to the axis of the blade and permitting the ferrule to be given a partial rotation with respect to the inner seat bearing with minimum friction losses. A roller thrust race 11, the axes of whose elements extend radially receives the centrifugal thrust of the blade and reduces friction when the angle of the blade is shifted. The blade 12 is of any suitable construction and is held rigidly in the ferrule 7 in any suitable way, as, for example, by ribs 13. Since with my improved device I eliminate stresses due to thrust and torque, it is only necessary in designing the ferrule to provide for resisting the centrifugal force.

The hub 2 is formed with a guide pin 14 for each blade, said guide pin being in line with the normal blade axis and mounted on said guide pin is a floating link 15 formed with a slot 16, whereby the floating link is movable with respect to the guide pin 14, for the purpose to be hereafter explained. The floating link 15 is formed with two slotted arms 17, said slots extending at right angles to the slot 16, and the floating link and its slotted arms are, as shown, preferably formed with a curvature paralleling that of the outer seat bearing. Two pins 18 carried by the blade engage the slots in the arms 17. The slotted arm 19 is connected to the arms 17, as shown in Fig. 3, and extends at right angles to the latter arms and cooperating with the slotted arm 19 is a link 20 secured to a ring 21, which turns with the hub 2, by means of a key 22 (see Fig. 1) but is movable longitudinally of the hub. As will be seen in Fig. 3, the slotted arm 19 for one of the propeller blades extends upwardly and the slotted arm for the other propeller blade extends downwardly, so that when the ring 21 is shifted longitudinally the arms 17 for the two blades will be moved angularly in opposite directions. In order to move the ring 21, I employ a yoke 23 mounted between two sets of ball bearings, as shown and connected in the usual way by levers leading to the cockpit. Secured within the end of each propeller blade is a seating pin 24, whose outer face slides in contact with the adjacent face of the disc from which the arms 17, 17, 19 radiate. This engagement holds the propeller blades substantially in their working positions when the motor is at rest.

In operation, when the motor is started and before any substantial centrifugal force has developed, the sudden impulse applied to each propeller blade, at each explosion, due to the torque causes the blade to turn on a center somewhat further out on the blade than the center 7. This slightly cocks the blade, resulting in a slight separation of the bearing surfaces 6 and 8 and engages the seating pin 24 with its cooperating surfaces so as thereby to lock the blade in its cocked position and cause the blade to act as a true flywheel.

As the speed increases and the centrifugal force is developed and the explosions become more rapidly successive, the propeller blade will be pulled out of its cocked position by the centrifugal force and the bearing surfaces 6 and 8 will come smoothly together. In actual practice, however, this result is accompanied by a slight chattering of the seating pin 24 with respect to its cooperating surface, so that the blade reaches its position of equilibrium by rotation about the center 7 with but very little friction. This position of equilibrium of the blades is obviously that where the thrust and torque are balanced by the centrifugal force, so that in operation each blade under the effect of the thrust will lie in a plane at a slight angle to the perpendicular of the shaft axis and under the effect of the torque will lie in the plane at a slight angle to the radius of the shaft axis. Thus, by balancing the forces acting upon the propeller blades, I eliminate cramping and binding due to thrust and torque and the shift of the angle of the propeller is resisted only by the friction due to the centrifugal force. Obviously the friction due to this cause is very much less than with prior devices, because the centrifugal force exerts a simple pressure on the roller bearing 11 and the only friction to be overcome is uncomplicated by considerations of clamping and binding tending to enormously increase the friction. By thus taking advantage of the fact that the centrifugal force in the operation of aircraft propeller enormously preponderates over thrust and torque forces, I am enabled to use propeller blades which are practically loosely hung from the shaft and which maintain their position in operation because of the centrifugal force. When, therefore, it becomes necessary to change the angle blades or to actually reverse them, it may be done very quickly and with relatively little power. Obviously this is effected by shifting the yoke 23 which swings the links 17 on the guide pin 14, turning the blade by reason of the engagement of the pins 18 with the slotted arms 17. By reason of the slotted connection 17, 18, the position of the blade may change without changing the blade angle. By reason of the slotted connection 16, with the guide pin 5, the position of the blade under variations of torque may change without changing the blade angle.

Having now described my invention, what I claim as new therein and desire to secure by Letters Patent, is as follows:

1. In an aircraft propeller, the combination with a driving shaft and a propeller blade loosely carried thereby, whereby its working position may be determined by a balance between the centrifugal and thrust forces, substantially as set forth.

2. In an aircraft propeller, the combination with a driving shaft and a propeller blade loosely carried thereby, whereby its working position may be determined by a balance between the centrifugal, thrust and torque forces, substantially as set forth.

3. In an aircraft propeller, the combination with a driving shaft and a propeller blade loosely carried thereby, whereby its working position may be determined by a balance between the centrifugal and thrust forces, and means for varying the angle of said blade, substantially as set forth.

4. In an aircraft propeller, the combination with a driving shaft and a propeller blade loosely carried thereby, whereby its working position may be determined by a balance between the centrifugal, thrust and torque forces, and means for varying the angle of said blade, substantially as set forth.

5. In an aircraft propeller, the combination with a drive shaft and hub thereof, of a propeller blade universally mounted in said hub, and means for changing the angle of the blade, substantially as set forth.

6. In an aircraft propeller, the combination with a drive shaft and hub, of a propeller blade carried by the hub and a spherical bearing between the blade and the hub, whereby the position of the blade may be determined automatically by a balancing of the forces to which the blade is subjected, substantially as set forth.

7. In an aircraft propeller, the combination with a drive shaft and hub, of a propeller blade carried by the hub and a spherical bearing between the blade and the hub, whereby the position of the blade may be determined automatically by a balancing of the forces to which the blade is subjected, and means for changing the angle of the blade, substantially as set forth.

8. In an aircraft propeller, the combination with a drive shaft and hub, of a propeller blade pivotally carried by the hub, so that its position may be determined by a balancing of the forces to which the blade is subjected, and means for preventing the angle of the blade from changing, substantially as set forth.

9. In an aircraft propeller, the combination with a drive shaft and hub, of a propeller blade pivotally carried by the hub, so that its position may be determined by a balancing of the forces to which the blade is subjected, means for preventing the angle of the blade from changing, and means for manually varying the angle of the blade, substantially as set forth.

10. In an aircraft propeller, the combination with a drive shaft and hub, of a propeller blade carried by the hub, a spherical bearing between the blade and hub to permit the position of the blade to change by a balancing of the forces to which it is subjected, and an anti-friction bearing between the blade and said spherical bearing, substantially as set forth.

11. In an aircraft propeller, the combination with a drive shaft and hub, of a propeller blade carried by the hub, a spherical bearing between the blade and hub to permit the position of the blade to change by a balancing of the forces to which it is subjected, an anti-friction bearing between the blade and said spherical bearing, and means for changing the angle of the blade, substantially as set forth.

This specification signed and witnessed this 21st day of April, 1921.

FRANK W. CALDWELL.

Witnesses:
ROBERT LENIHAN,
HELEN F. CHAMBERS.